Feb. 6, 1923.
E. HUFFINE
1,444,544
REPLANTER ATTACHMENT FOR CULTIVATORS
Filed Dec. 6, 1919      2 sheets-sheet 1
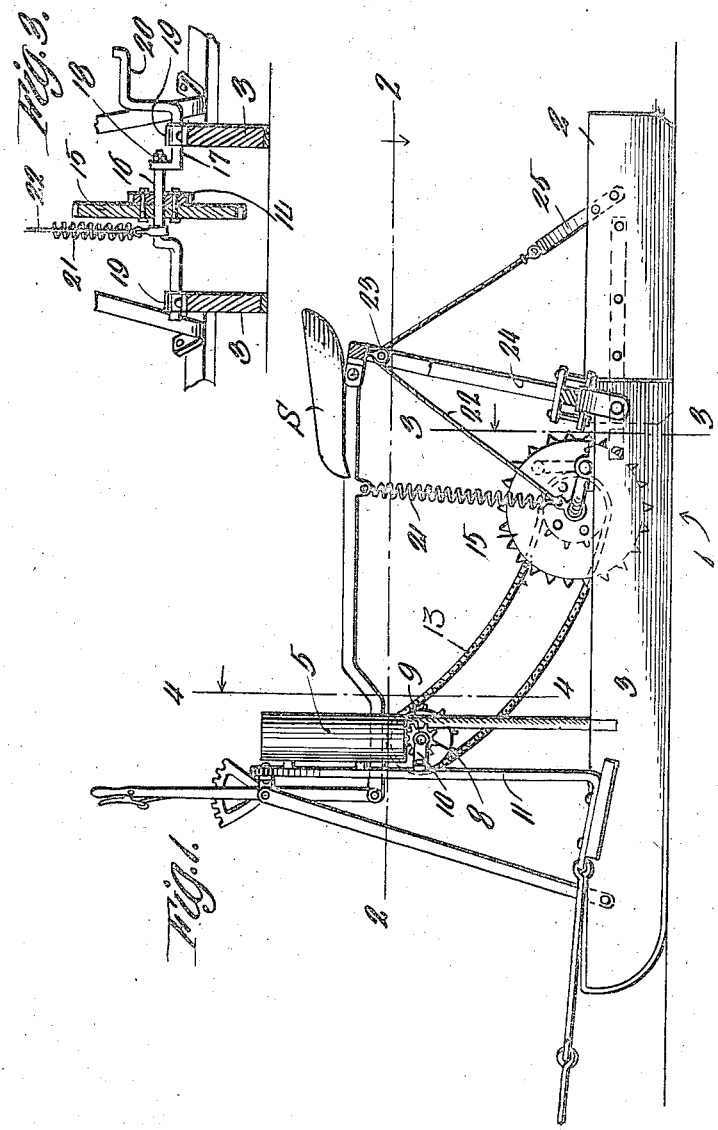
WITNESSES
Guy M. Spring
S. M. McColl
Inventor
ED HUFFINE
By Richard B. Owen
Attorney

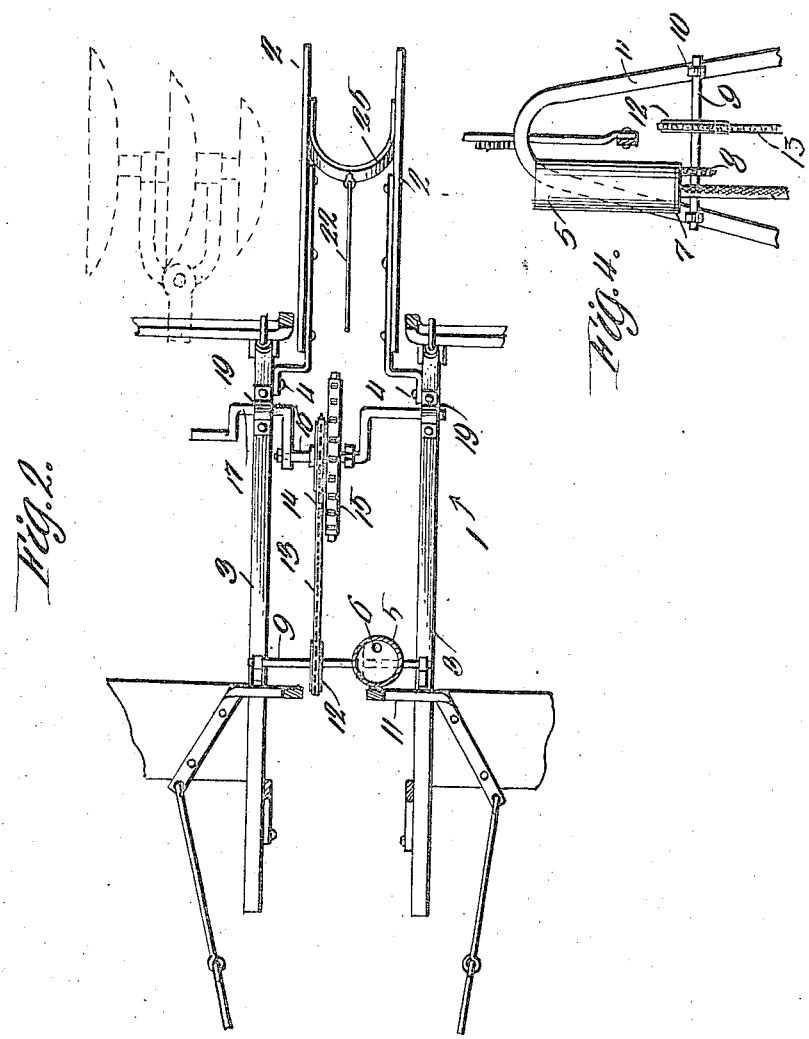

Patented Feb. 6, 1923.

1,444,544

UNITED STATES PATENT OFFICE.

ED HUFFINE, OF GRENVILLE, NEW MEXICO.

REPLANTER ATTACHMENT FOR CULTIVATORS.

Application filed December 6, 1919. Serial No. 342,976.

*To all whom it may concern:*

Be it known that I, ED HUFFINE, a citizen of the United States, residing at Grenville, in the county of Union and State of New Mexico, have invented certain new and useful Improvements in Replanter Attachments for Cultivators, of which the following is a specification.

This invention relates to a planter attachment and more particularly to attachments for sled cultivators.

The object of this invention is to provide an attachment of this character for replanting missing hills of corn and the like which have been planted by a lister.

Another object is to so construct such an attachment that it may be applied to any sled cultivator already in use.

Another object is to construct an attachment of this character which may be controlled by the cultivator driver and which simultaneously drops the grain and lifts the cultivator fender to permit the cultivating elements to cover the grain dropped.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:

Figure 1 represents a side elevation of a sled cultivator equipped with this improved planting attachment.

Fig. 2 is a horizontal section taken on the line 2—2 with parts broken out.

Fig. 3 is a detail vertical section taken on the line 3—3 of Fig. 1 and

Fig. 4 is a similar view taken on the line 4—4 of Fig. 1.

In the embodiment illustrated a sled cultivator 1, of any ordinary construction, is shown having the usual fenders 2 pivoted at their front ends to the sled runners 3 as shown at 4.

The attachment constituting this invention includes a seed hopper 5 mounted at the front of the cultivator having an aperture 6 in the bottom thereof, covered by the usual feedplate 7 which is actuated by a tooth disk 8, fixed to a shaft 9, mounted in suitable bearings 10 of an upstanding portion 11 of the cultivator frame. A sprocket wheel 12 is also fixed to shaft 9 and a driving chain 13 extends over this sprocket wheel 12 to a driving sprocket wheel 14 carried by a drive wheel 15 which is preferably toothed on its periphery to adapt it to engage the earth when moved downwardly whereby it is rotated for driving the sprocket wheel 12 and thus actuating the feed disk 7.

The driving wheel 15 is mounted to turn on a crankshaft 16, the crank 17 of which is detachably connected therewith by a nut 18 to provide for the application and removal of wheel 15. This crankshaft 16 is mounted in suitable bearings 19 carried by the upper edges of the runners 3.

A crank arm 20 is also carried by the crankshaft 16 as is shown clearly in Figs. 2 and 3 and is designed to be engaged by the foot of the driver whereby the shaft 16 is turned to lower the driving wheel 15 into engagement with the earth.

A coil spring 21 connects the crankshaft 16 with a fixed portion of the cultivator frame in a plane above the wheel as is shown clearly in Fig. 1 and operates to yieldably hold the crankshaft in elevated position to retain the driving wheel 15 out of contact with the earth over which the cultivator is being propelled. It is obvious that when pressure is exerted on the crank arm 20 the shaft 16 will be moved downwardly against the tension of the spring 21 and when such pressure is removed this spring will retract and lift the crankshaft into the position shown in Figs. 1 and 3.

A cable 22 is secured at one end to the crankshaft 16 and passes over a pulley 23, carried by the seat standard 24 and is secured at its other end to a yoke 25 fixed to the fenders 2 of the cultivator.

In the use of this attachment the parts being in the position shown in Figs. 1 and 3 when the driver of the cultivator who is mounted on seat S discovers a missing hill he immediately depresses the crank arm 20 by means of his foot causing the crankshaft 16 to turn sufficiently to lower the driving wheel 15 to contact with the earth. This contact causes the wheel to rotate and chain 13 to actuate the sprocket wheel 12, shaft 9 and feed plate wheel 8, thereby causing grain to be dropped through the aperture 6 into the missing hill. This turning of the crankshaft 16 also operates to exert a pull on the cable 22 thereby lifting the fenders 2 simultaneously with the dropping of the grain from the hopper so that the cultivating elements here shown in the form of disks will cover the grain dropped.

From the above description it will be obvious that this planter attachment may be applied to any cultivator already in use and it may be used for replanting missing hills or for planting between rows if felt desirable.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

Having thus fully described my invention, what I claim as new and desire to secure by Letters Patent, is:

1. The combination with a cultivator having a fender, of a seed hopper mounted on said cultivator and having dropping mechanism, an oscillating crank shaft, means carried by said crank shaft to actuate the seed dropping mechanism, and means operable on the turning of the crank shaft to raise the fender simultaneously with the actuation of the seed dropping mechanism.

2. The combination with a cultivator, of a seed hopper mounted on said cultivator and having dropping mechanism, a crankshaft, a drive wheel loose to turn on the crank of said shaft and normally held out of contact with the ground, a crank arm carried by said shaft to turn said shaft to lower said wheel into engagement with the ground, and means driven by said wheel to actuate said dropping mechanism.

3. The combination with a cultivator of a seed hopper mounted on said cultivator and having dropping mechanism, a crankshaft, a drive wheel loose to turn on the crank of said shaft, a coiled spring connecting the crank of said shaft to a fixed part of the cultivator to normally hold said wheel out of contact with the ground, and a crank arm carried by said shaft to turn said shaft to lower said wheel, and means driven by said wheel to actuate said dropping mechanism.

4. The combination with a cultivator having a fender, a seed hopper mounted on said cultivator and having dropping mechanism, a crankshaft, means carried by said crankshaft to actuate the said dropping mechanism, and a cable connecting the crank of said crankshaft with said fender, whereby the latter is raised simultaneously with the dropping of the seed.

In testimony whereof I affix my signature in presence of two witnesses.

ED HUFFINE.

Witnesses:
E. L. KELLER,
W. L. THOMAS.